United States Patent [19]

Stefanopoulou et al.

[11] Patent Number: 5,787,848
[45] Date of Patent: Aug. 4, 1998

[54] METHOD OF SYSTEM FOR OPERATING AN INTERNAL COMBUSTION ENGINE HAVING VARIABLE VALVE TIMING

[75] Inventors: Anna Stefanopoulou, Ann Arbor; Ilya V. Kolmanovsky, Ypsilanti, both of Mich.

[73] Assignee: Ford Global Technologies, Inc., Dearborn, Mich.

[21] Appl. No.: 985,646

[22] Filed: Dec. 5, 1997

[51] Int. Cl.$^6$ ............................. F01L 1/34; F01L 13/00
[52] U.S. Cl. ............................. 123/90.15; 123/90.17; 123/571
[58] Field of Search ............................. 123/90.15, 90.16, 123/90.17, 90.31, 568, 571

[56] References Cited

U.S. PATENT DOCUMENTS

| | | | |
|---|---|---|---|
| 4,142,493 | 3/1979 | Schira et al. | 123/571 |
| 4,164,206 | 8/1979 | Toelle | 123/571 |
| 4,173,205 | 11/1979 | Toelle | 123/571 |
| 5,417,187 | 5/1995 | Meyer et al. | 123/90.15 |
| 5,533,489 | 7/1996 | Socci et al. | 123/571 |
| 5,611,304 | 3/1997 | Shinojima | 123/90.15 |
| 5,623,896 | 4/1997 | Kato et al. | 123/90.15 |
| 5,628,286 | 5/1997 | Kato et al. | 123/90.15 |
| 5,680,834 | 10/1997 | Szpak et al. | 123/90.15 |
| 5,690,065 | 11/1997 | Van Vuuren | 123/90.15 |

*Primary Examiner*—Weilun Lo
*Attorney, Agent, or Firm*—Jerome R. Drouillard

[57] ABSTRACT

A system for adjusting the operating timing of a cylinder valve system of a reciprocating internal combustion engine determines a static cylinder valve timing based upon at least two engine operating parameters and a time constant for governing the transient behavior of a valve phaser for adjusting valve timing according to the output of a filter.

9 Claims, 2 Drawing Sheets

METHOD OF SYSTEM FOR OPERATING AN INTERNAL COMBUSTION ENGINE HAVING VARIABLE VALVE TIMING

BACKGROUND OF THE INVENTION

1. Field of the Invention

The present invention relates to a method and system for adjusting the timing of a cylinder valve system in a reciprocating internal combustion engine so as to allow optimized torque output with minimum emissions of oxides of nitrogen.

2. Background Information

Exhaust gas recirculation (EGR) is used to reduce the formation of oxides of nitrogen (NOx) in internal combustion engines. In essence, inert exhaust gases dilute the inducted air/fuel charge and lower the peak combustion temperature, which reduces nitrogen fixation and consequently, NOx feedgas emissions from the engine. Conventionally, exhaust gas recirculation is accomplished by controlling a flow of exhaust gas originating from the engine's exhaust manifold to the intake manifold, by means of an electrically or vacuum actuated valve. Because circulation of the exhaust gas generally relies upon a higher pressure in the intake manifold than in the exhaust manifold, conventional EGR systems do not work well with supercharged or turbocharged engines.

Conventional EGR control algorithms include an integral or proportional-integral-derivative loop that adjusts EGR valve position to a scheduled steady-state value. Because EGR alters the breathing process dynamics, and consequently, the torque response of an engine, careful steady-state and transient control design is necessary to maintain good engine torque response. For this reason, EGR is typically turned off or is considerably delayed during transient engine operation as well as during cold engine operation and during idling. Advances in real-time computing and hardware have made possible the application and control of the cylinder gas exchange process and therefore the possibility of internal EGR. Achieving EGR by allowing gas from the exhaust manifold to revert into the engine's cylinders provides better control of the residual mass fraction remaining in the cylinder at the end of the exhaust stroke for several reasons: the long transport delay associated with the exhaust-to-intake manifold path is eliminated; the slow dynamics associated with intake manifold filling are avoided; and, as noted above, internal EGR does not depend upon a differential pressure between the intake and exhaust manifolds. The final advantage is particularly important with engines which are operated in fuel-lean regions, such as Diesel and direct injected spark ignition engines, because such engines are often turbocharged.

One method used to regulate internal EGR is camshaft phasing. Alternatively, one may accomplish this by directly controlling valve events.

Fast transient control of internal EGR is limited by actuator dynamics and computational delays. However, recent development of internal EGR (IEGR) systems in throttled engines shows that the IEGR system interacts with the slow intake manifold filling dynamics and can cause unacceptable engine performance. FIG. 2 illustrates performance of an engine having zero EGR, a maximum level of EGR, and an operating EGR schedule. Note, with the maximum EGR schedule, the torque response falls off sharply as compared with both the zero EGR and the operating EGR schedule.

FIG. 5 illustrates what may happen if the valve timing, and hence, the EGR rate, is changed either too slow or too fast. The problem here is that if the IEGR rate changes too fast, for example, due to fast camshaft timing changes, the torque response may submit the exhibited undershoot. This occurs because the airflow tends to decrease with an increase in camshaft timing. However, if the camshaft timing changes too slowly, the torque may overshoot. This happens because the airflow first increases quickly due to the intake pressure dynamics caused by a larger throttle angle, then the airflow decreases due to the camshaft timing slowly approaching the desired, larger than initial value. From the driver's perspective, both the undershoot and the overshoot are undesirable. The undershoot is felt as a sag or, the vehicle is said to "lay down".

It is a purpose of the present invention to operate a valve timing selector, such as a camshaft phaser, so that the transient torque response of an engine with a reasonable level of EGR has similar in character to the transient torque response of an engine with no EGR supply system.

SUMMARY OF THE INVENTION

According to the present invention, IEGR is dynamically scheduled so that a valve phaser moves the camshaft, or other type of valve operating gear, to an optimum steady-state value which is based on measured throttle angle and engine speed. The dynamic scheduling consists of a time constant wherein a first order differential equation defines the transient behavior of IEGR from one steady-state point to the next. The time constant is itself selected as a function of at least engine speed and throttle position.

According to the present invention, a system for adjusting the timing of a cylinder valve system of a reciprocating internal combustion engine includes a plurality of sensors for measuring values of a plurality of engine operating parameters, and a controller connected with the sensors for receiving the measured values of the operating parameters. The controller includes a valve timing selector for determining the static cylinder valve timing based on at least two engine operating parameters, a response time selector for determining a time constant for adjusting the valve timing based upon the values of at least two of said operating parameters, and a filter incorporating the predetermined time constant, for controlling the speed of adjustment of the cylinder valve system from an existing static valve timing to a desired static valve timing. Finally, a valve phaser, operated by the controller, adjusts the valve timing according to the output of the filter.

According to a preferred embodiment, the present valve timing selector determines the static valve timing based upon at least a measured position of a manually controlled throttle and a measured engine speed. This is similar for the selection of a time constant which may also be determined from matched values of time, measured throttle position, and measured engine speed. A look-up table contained within the controller may be used for determining values of desired static valve timing and time constant.

According to another aspect of the present invention, the filter used in the present invention may comprise a low pass filter, with the valve phaser comprising a camshaft phase shifter.

According to yet another aspect of the present invention, a method for adjusting the timing of a cylinder valve system of an internal combustion engine having variable valve timing includes the steps of measuring a plurality of engine operating parameters related to valve timing, with the parameters including at least the position of a manual throttle and engine speed, selecting a desired static valve timing and a time constant based upon said measured values of throttle position and engine speed, and adjusting the valve timing to the desired static valve timing while filtering the speed of adjustment for low pass filter incorporating said time constant. The present method may also include the selection of static valve timing and time constant values from look-up tables contained within the memory of an engine controller.

The values contained within the look-up tables for static valve timing and time constant may be determined by operating an engine at fixed throttle positions and engine speeds while adjusting the valve timing from one static timing to another static timing at various throttle angles while recording the resultant steady state torque output of the engine. Thereafter, values for static valve timing and time constant for adjusting the valve timing are selected, so that an engine operated according to the present method will have a torque output which neither undershoots nor overshoots an idealized torque output. Although the torque output of an engine having the present system will be less than the torque output of an engine having little or no EGR, the point to be made is that the novel system allows an engine's transient torque output curves to have the same inflection points and slopes as an engine without EGR. Thus, it may be said that the present system allows the transient torque characteristics of both engines to be matched.

It is an advantage of the present invention that an engine equipped with the method and system according to this invention may be used with higher rates of EGR while still producing a smooth, monotonic torque response.

It is a further advantage of the present invention that an engine operating with this invention will not require any external EGR valves or EGR plumbing and, as a consequence, the expense of such an external EGR system will be obviated.

It is a further advantage of the present invention that an engine operating with this invention will have substantially the same transient torque response as an engine without EGR.

Other advantages and features of the present invention will become apparent to the reader of this specification.

DETAILED DESCRIPTION OF PREFERRED EMBODIMENTS

Figure 1:
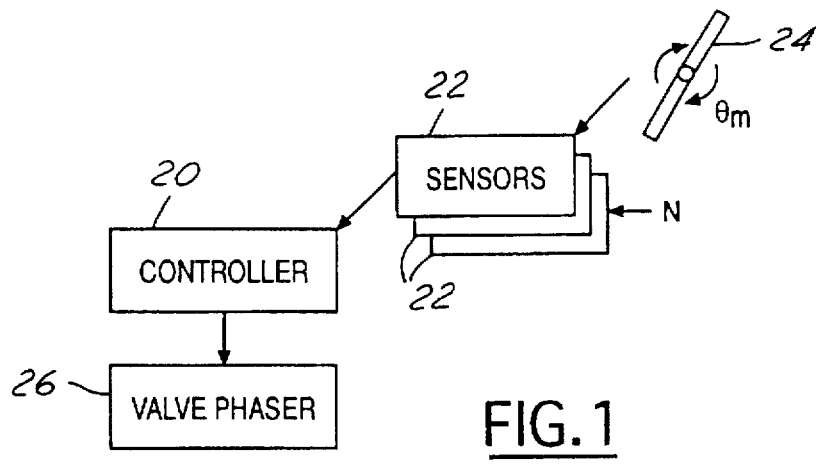
FIG. 1 is a block diagram of a control system according to the present invention.

As shown in FIG. 1, a control system utilizes engine controller 20, which is drawn from a class of such controllers known to those skilled in the art and suggested by this disclosure. Controller 20 receives inputs from a plurality of sensors 22 which measure a plurality of engine operating parameters. For example, one of sensors 22 measures the position of manually controllable throttle 24; another sensor 22 measures the value of engine operating speed, N. Controller 20 operates valve phaser 26, which is drawn from a class of devices known to those skilled in the art of engine design and suggested by this disclosure. For example, valve phaser 26 may comprise a device for changing the position of a valve operating camshaft vis-a-vis the position of the engine's crankshaft, or a valve timing or phase shifting device for use with electrohydraulically driven valves or solenoid operated valves, or any other type of cylinder valve having variable valve timing operating gear used with a reciprocating internal combustion engine.

Figure 2:
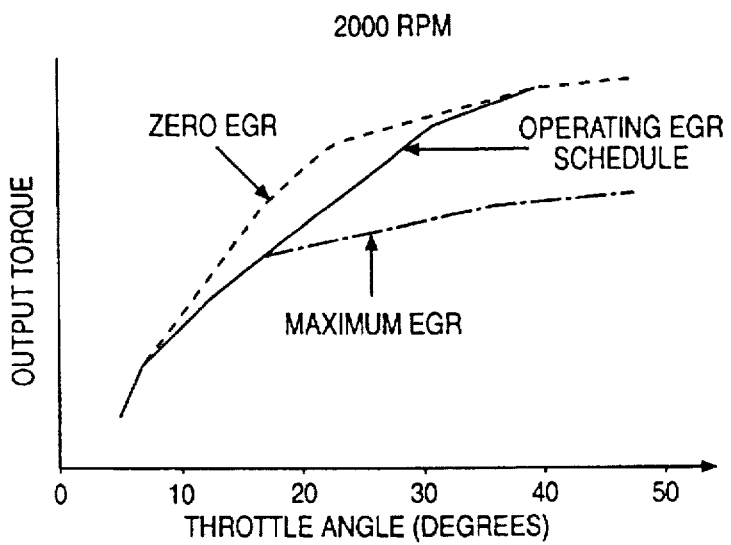
FIG. 2 illustrates steady state performance curves of an engine having various EGR control schemes.
Figure 5:
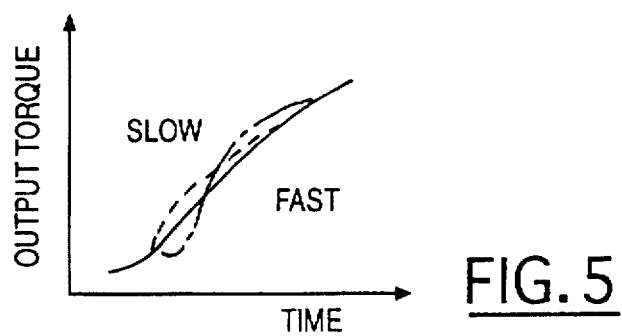
FIG. 5 illustrates transient torque curves of an engine having various rates of exhaust timing control.

As noted above, the purpose of the present invention is to operate an engine according to the solid lines of FIGS. 2 and 5. The dashed line of FIG. 2, labeled "zero EGR", although producing highest torque of any EGR strategy, also will produce the highest level of $NO_x$—a regulated pollutant which must be controlled by the manufacturers of automotive vehicles and engines. On the other hand, the maximum EGR line, which is the dot-dash line of FIG. 2, although producing generally the lowest levels of oxides in nitrogen, will cause a problem with torque diminishment as shown in FIG. 2. Thus, it is desirable to implement a practicable operating EGR schedule as shown in the solid line of FIG. 2.

Figure 3:
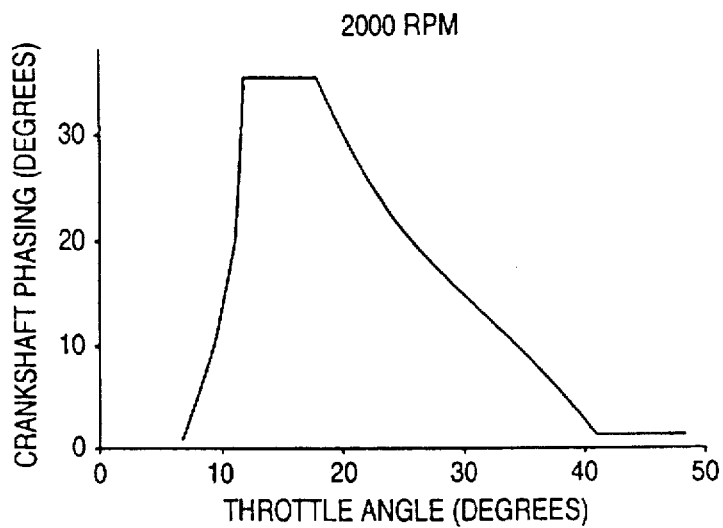
FIG. 3 illustrates an idealized plot of camshaft phasing as a function of throttle angle at a fixed engine speed.

FIG. 3 illustrates the results of engine testing intended to determine, at a constant speed indicated in FIG. 3 as 2000 rpm, the desirable camshaft phasing (measured in degrees) as a function of throttle angle (also measured in degrees). The curve illustrated in FIG. 3 is developed by operating a candidate engine at a variety of camshaft phase angles at constant speed and constant throttle angle, while measuring the engine's output torque. Then, camshaft phase angles are selected to produce the solid line torque output curve shown in FIG. 2. Note, from FIG. 3, that at both low values of throttle angle and extremely high values of throttle angle, camshaft phase change is essentially zero. At a mid-range, i.e., between 10–20 degrees of throttle angle, the camshaft phasing is held essentially constant. Finally, at higher angles, i.e., 20–40 degrees, the camshaft phasing is reduced proportionately to throttle angle. In practice, a curve similar to FIG. 3 will be generated for a multitude of engine speeds, to permit selection of an appropriate camshaft phasing at any engine speed.

Once a family of curves having the configuration of the FIG. 3 has been generated, the candidate engine is operated from one static cam timing $u_{STATIC}$ to another value of $u_{STATIC}$ at various speeds of valve phaser 26, so as to verify the valve phaser operating speed required to attain the smooth operation illustrated by the solid line of FIG. 5. A look-up table containing filter time constant values corresponding to the predetermined valve phaser operating speeds is generated and embodied in controller 20. The time constants are determined by performing a sensitivity analysis upon the engine test data. In essence, the engine's transient output torque is a function of engine speed, throttle opening, camshaft position, intake manifold pressure, and intake manifold filling dynamics. These relationships may be expressed as partial derivatives. By reducing the engine test data through numerical integration, camshaft phasing time constants may be determined which will allow the engine to mimic the transient torque output of an engine having no EGR. Using time constants developed in this manner, the engine's torque output will neither undershoot nor overshoot an idealized output curve such as the solid line curve of FIG. 5.

Figure 4:
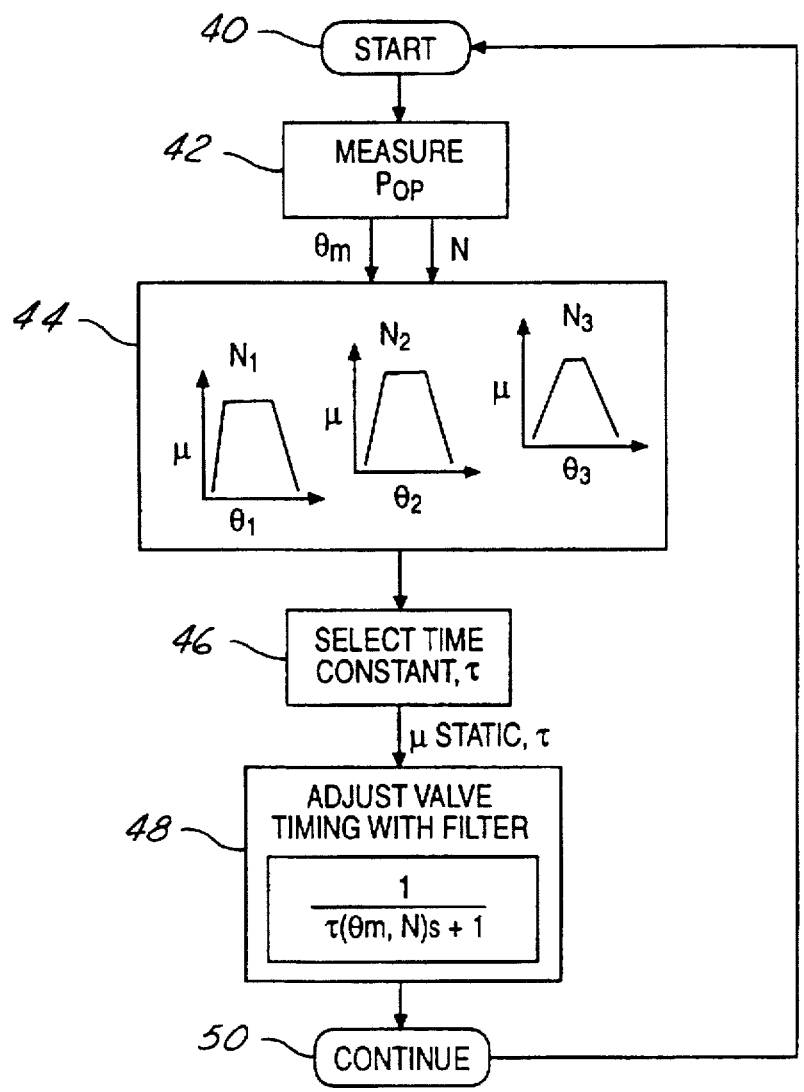
FIG. 4 is a block diagram of a control system according to the present invention.

FIG. 4 illustrates the operation according to a method for adjusting the timing of a cylinder valve system of an internal combustion engine having variable valve timing. The routine begins at block 40, and at block 42, various operating parameters, $P_{OP}$, are measured. As shown in FIG. 1, the manual throttle angle, $\theta_M$, and engine speed, N, specifically, are measured with sensors 22. Moving to block 44, controller 20 searches through a look-up table to find a family of entries corresponding to engine speed N, and having found such a family, controller 20 applies the value $\theta_M$ and extracts from the look-up table a value for $u_{STATIC}$, which is static cam timing. The look-up table of block 44 is developed with a family of curves, each having the information of the plot illustrated in FIG. 3. In other words, a value for a time constant, $\tau$, will be placed into a time constant table with corresponding values for $\theta_M$ and N.

At block 46, controller 20 moves valve phaser 26 to the new static cam timing value according to the output of a low pass filter having the configuration:

$$u = \frac{u_{STATIC}}{\tau(\theta_M, N)S + 1}.$$

The value for $\tau$ is picked from the previously described time constant look-up table. Finally, the routine continues at block 50, wherein the operation is run once again to select a new static value of valve timing, $u_{STATIC}$ and a new value for $\tau$.

Those skilled in the art will appreciate in view of this disclosure that although the parameters of throttle angle and engine speed are shown as being relied upon for selection of static cam timing $u_{STATIC}$ and also for the selection of $\tau$, those skilled in the art will appreciate that other engine operating parameters could be employed for the purpose of operating a system according to the present invention.

We claim:

1. A system for adjusting the timing of a cylinder valve system of a reciprocating internal combustion engine, comprising:
   a plurality of sensors for measuring the values of a plurality of engine operating parameters;
   a controller connected with the sensors for receiving the measured values of said operating parameters, with said controller comprising:
      a valve timing selector for determining a desired static cylinder valve timing based upon the values of at least two of said engine operating parameters;
      a response time selector for determining a time constant for adjusting the valve timing based upon the values of at least two of said operating parameters; and
      a filter incorporating said time constant, for controlling the speed of adjustment of the cylinder valve system to the desired static valve timing; and
   a valve phaser, operated by said controller, for adjusting the valve timing according to the output of said filter.

2. A system according to claim 1, wherein said valve timing selector determines the desired static valve timing based upon at least a measured position of a manually controllable throttle and a measured engine speed.

3. A system according to claim 2, wherein said valve timing selector selects the desired static valve timing from a look-up table containing matched values of static valve timing, throttle position, and engine speed.

4. A system according to claim 1, wherein said response time selector selects said time constant from a look-up table containing matched values of time, measured throttle position, and measured engine speed, with said time constant being chosen such that the transient torque response of an engine equipped with said system will have substantially the same characteristics as an engine without EGR.

5. A system according to claim 1, wherein said filter comprises a low pass filter.

6. A system according to claim 1, wherein said valve phaser comprises a camshaft phase shifter.

7. A method for adjusting the timing of a cylinder valve system of an internal combustion engine having variable valve timing, comprising the steps of:
   measuring a plurality of engine operating parameters related to valve timing, including at least the position of a manual throttle and engine speed;
   selecting a desired static valve timing and a time constant based at least upon said measured values of throttle position and engine speed; and
   adjusting the valve timing to the desired static valve timing, while filtering the speed of adjustment with a low pass filter incorporating said time constant such that the transient torque response of the engine has the same characteristics as the torque response of the same engine without any EGR flow.

8. A method according to claim 7, wherein said static valve timing and said time constant are selected from look-up tables contained within the memory of an engine controller.

9. A method according to claim 8, wherein the values contained within said look-up tables are determined by operating an engine at fixed throttle positions and engine speeds, while adjusting the valve timing from one static timing to another static timing, while recording the resultant torque output of the engine, and thereafter reducing the data to determine said values for static valve timing and time constant so that an engine operated according to said method will have a monotonic transient torque output having the substantially the same characteristics as if the engine was operated without EGR.

* * * * *